March 1, 1955

W. J. RUBLE 2,703,397

APPARATUS FOR SUBMARINE ECHO RANGING

Filed May 14, 1943

INVENTOR
WILBUR J. RUBLE
BY
ATTORNEY

March 1, 1955

W. J. RUBLE 2,703,397

APPARATUS FOR SUBMARINE ECHO RANGING

Filed May 14, 1943

INVENTOR
WILBUR J. RUBLE
BY
ATTORNEY

2,703,397

APPARATUS FOR SUBMARINE ECHO RANGING

Wilbur J. Ruble, United States Navy

Application May 14, 1943, Serial No. 486,942

2 Claims. (Cl. 340—8)

(Granted under Title 35, U. S. Code (1952), sec. 266)

This invention relates generally to improvements in acoustical apparatus and in particular to the control of such apparatus when used for projecting supersonic sound waves beneath the surface of a body of water.

The art to which this invention relates has for some time understood the technique of and apparatus for the projection of sound waves of supersonic frequency from a sound projector located beneath the surface of the water, as for example a sound projector extending through a ship's skin, in order to seek out and locate an object under the water's surface by the technique of obtaining an echo of the sound reflected from such object.

The echo technique is now made use of to determine the presence, distance and relative bearing of the underwater object, which may for example be the underwater portion of a surface vessel or submarine invisible to the eye, from a supersonic sound projector which may be carried below the water's surface by another vessel.

To obtain the bearing of the object, present known sound projectors are provided with a mounting which may be rotated about a vertical axis only and so cause the sound beam to be projected in a substantially horizontal plane in any relative bearing from 0° to 360°. The terms "vertical" and "horizontal" as used herein are of course relative to the vessel carrying the sound projector when the vessel is level, i. e. on an even keel. Thus the projector may be rotated until an echo from the object is received and its bearing noted on any suitable indicating means.

However, in view of the fact that the sound projector is purposely designed so that the supersonic, compressional wave energy propagated therefrom is confined to a rather concentrated conical beam having an apical angle of about 20° or less at the projector, and the further fact that motion of the projector is limited to rotation about a vertical axis, it will be evident that the echo apparatus will not be able to detect the presence of objects, such as a submerged submarine, unless the latter is located at a distance from the sound projector sufficient to insure that the sound beam will not pass entirely over the submarine.

In other words, the apparatus of present design is "blind" to the near presence of deeply submerged objects such as a submarine, and operation of the apparatus is satisfactory only when the submarine is at a sufficient distance from the sound projector so as to fall within the area searched out by the substantially horizontal conical sound beam as the beam is rotated. For example, it has been found that with present known apparatus, a submarine submerged to a depth of 150' and at a distance of 900' cannot be detected because the submarine at such a position relative to the sound projector is below the beamed area swept by the projector.

It is therefore a principal object of my invention to modify existing types of sound projectors and so improve their functions and scope of operations that they will be operative under all conditions with respect to the relative positions of the sound projector and the object which reflects the sound waves.

A more specific object is to provide a sound projector which is movable in a vertical as well as horizontal plane whereby the sound beam may be projected at any vertical angle from a horizontal direction to a vertical direction and may also be rotated in azimuth from 0° to 360°.

A further specific object is to provide for the suspension of a supersonic sound projector for rotation thereof about a vertical axis to permit the sound beam to be projected horizontally in any relative bearing from 0° to 360°, the projector being also suspended on a second axis which is perpendicular to the vertical axis, thereby permitting the sound beam to also be projected vertically through any vertical angle. Such universal suspension eliminates any possibility of there being any 'blind" area where detection cannot be made and provides means whereby the horizontal or near surface distance from the sound projector to an object as well as the depth of the latter may be computed.

The improved sound projector disclosed in this application makes possible a further object of my invention which is to provide a new method of anti-submarine warfare.

In present tactics of anti-submarine warfare, a horizontal beam of compressional wave energy is propagated from a sound projector on the attacking vessel through the water medium and this beam is rotated about its vertical axis to search out a limited expanse of water. Should the beam be intercepted by a submerged vessel, the echo of the beam would be detected, thus indicating to the attacking vessel the presence, bearing and linear distance to the submerged vessel. However, because of the fixed horizontal beam, the attacking vessel cannot maintain sound contact with the submarine after the former has closed the range to a position where the beam passes over the submarine rather than being reflected by it. Hence present tactics require that the attacking vessel proceed at its highest possible speed toward the submerged target until it is believed to be within its general vicinity at which time large depth bombs are discharged in a "shotgun pattern" with the hope that one or more of the bombs will explode sufficiently near the submerged vessel to destroy or at least damage it.

In present tactics, time does not permit the attacking vessel to determine either the course or speed of the submerged vessel. Furthermore, as a result of the high speed "run-in," the attacking vessel loses sound contact with the submerged vessel probably even before the submerged vessel is at a position below the beam. This procedure has not proven to be an effective method of counteracting the submarine menace.

No accurate or reliable data appear to be available on the vertical projection of the beam pattern of existing sound echo-ranging equipment and opinions differ widely as to the distance vs. depth ratio at which sound contact is lost due to the submarine being under the sound beam. However, various reports available would indicate that sound contact is lost at distances between the attacking vessel and target varying from 100 yards to as much as 500 yards. After sound contact has been lost and the depth charges have been dropped, it is practically impossible to immediately regain sound contact in the event that the submerged vessel has avoided the depth charges because the turbulence produced as a result of the detonation of these depth charges effectively prevents further propagation and echo reception of the sound beam for a considerable length of time, such time often being sufficient to allow the submarine to escape.

Therefore it is a further object of my invention to provide a new and more effective method of anti-submarine warfare which dispenses with the need for high speed "run-ins" now made necessary because of present use of the large depth detonated charges: the new method permits low speed, continuous sound contact, and accurate dropping of relatively small, contact detonated bombs from the attacking vessel when the latter is in the optimum firing position i. e. on a collision course and passing directly over the submarine, such position being established by methods which will be described in detail hereinafter.

These and other objects of my invention will become more apparent from the description to follow and from the accompanying drawings, wherein.

Figure 3:
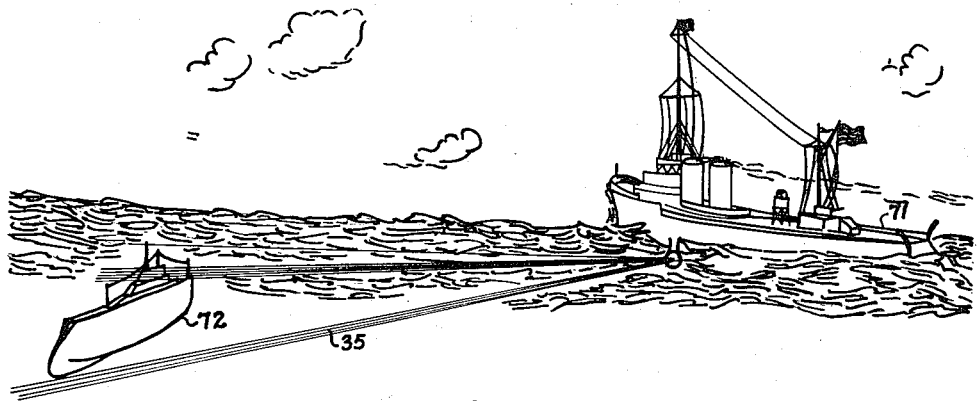
Figure 4:
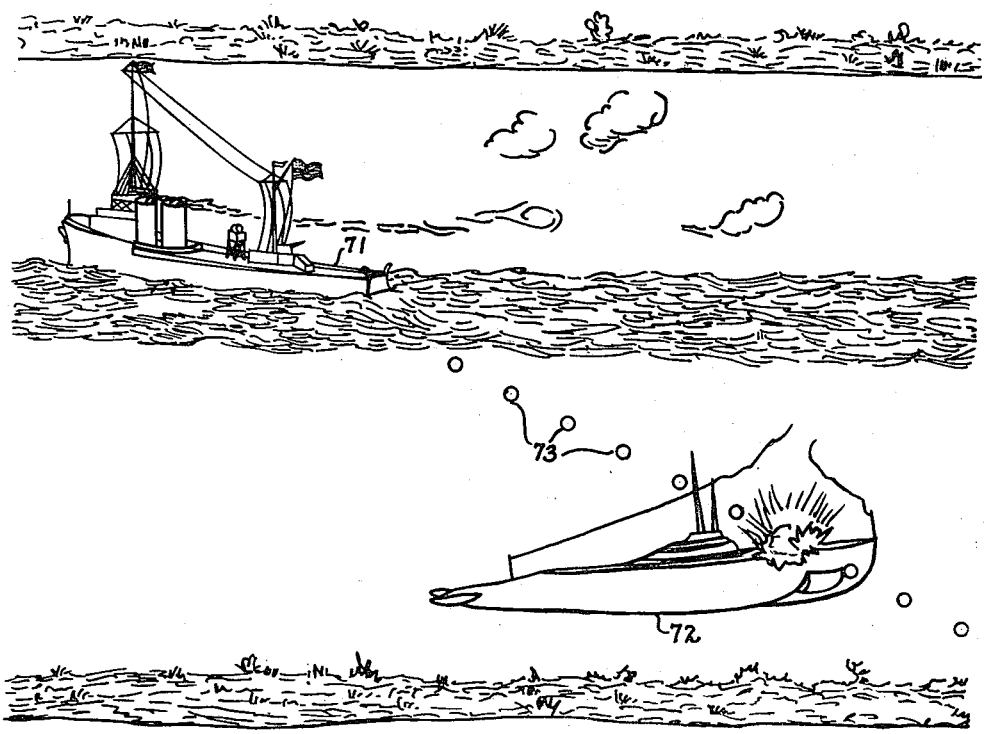

Fig. 3 is a graphical illustration of the method of my invention for determining the position and course of a submerged object by continuously observing the range, bearing and tilt angle of a supersonic beam which is propagated from my improved sound projector and subsequently reflected by the object; and Fig. 4 is a graphical illustration of my improved method of anti-submarine warfare when the attacking vessel has been maneuvered so as to cross directly over the submarine.

Figure 1:
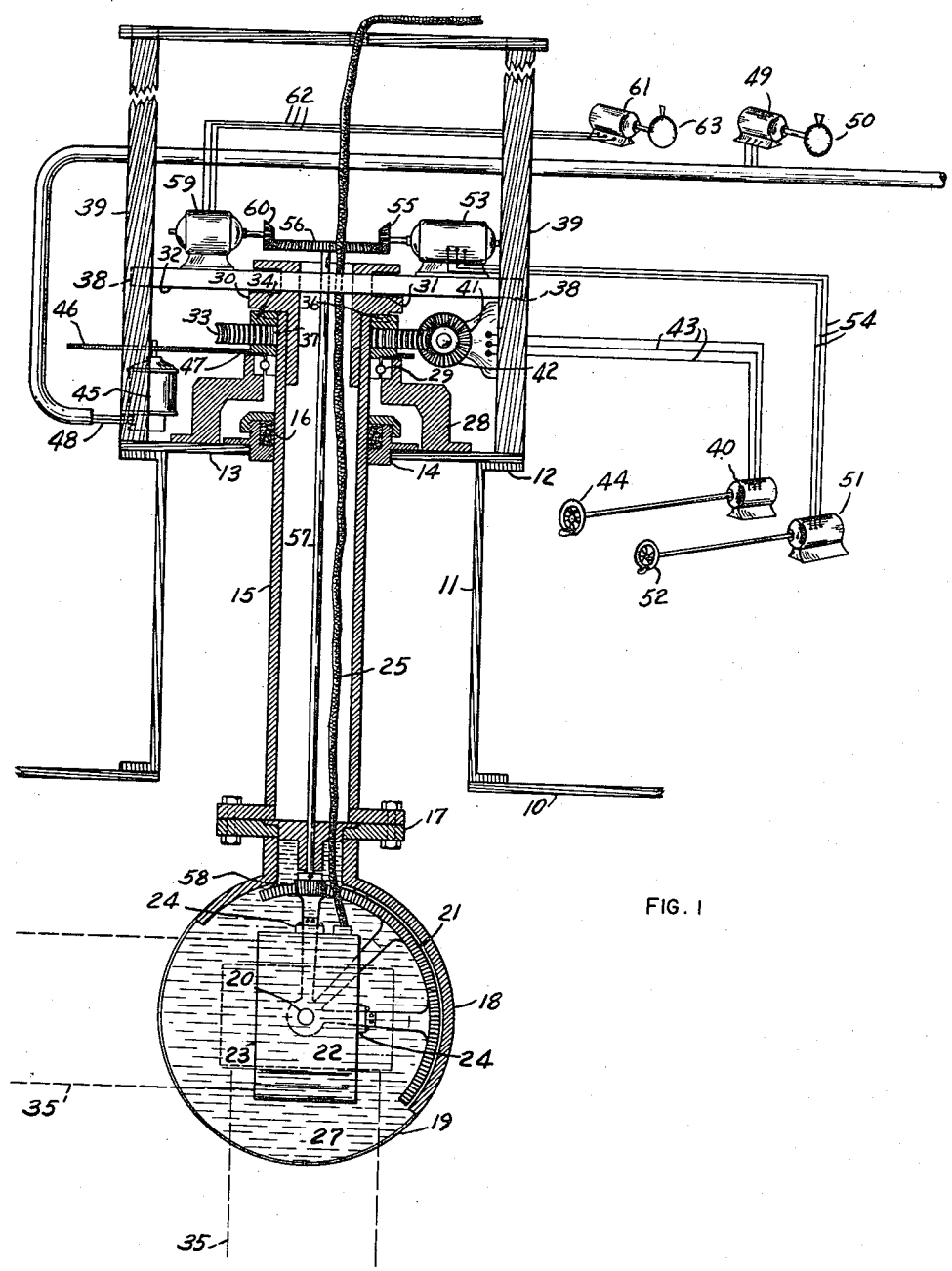
Fig. 1 is a combined schematic diagram and vertical sectional view of my improved supersonic sound projector and the control apparatus associated therewith.

Referring now to Fig. 1, a ship's bottom or "skin" as it is often called is designated at 10. A hollow cylindrical member 11 commonly called a "sea chest" extends inwardly from the skin of the ship and terminates in a flanged portion 12. A plate member 13 which rests upon the flange 12 to form the top of the sea chest 11 contains a central opening 14 through which a hollow shaft 15 extends and a packing gland 16 is provided to make a watertight seal between shaft 15 and the opening 14.

At the bottom of the shaft 15 and connected thereto by a flanged coupling 17 is a spherical housing consisting of two hemispherical portions, one of which comprises a relatively thick, metallic casting 18 and the other a sound transparent cap 19 of relatively thin stainless steel. The casting 18 is purposely made quite thick so as to shield out any sound waves which might come from a rear direction.

A shaft 20 extending through the walls of the casting 18 is utilized for mounting a sector gear 21 which preferably extends over an arc of about 120°.

A sound projector 22 which is cylindrical in shape and disposed within the spherical housing, has a flat face portion 23 on the left side thereof which carries a diaphragm, the latter being caused to vibrate or oscillate by suitable electrically operated mechanism located within the body of the projector.

The sound projector 22 may be of any well known type now available on the market such as the Rochelle salts or magnetostrictive type and hence no detailed structural features thereof have been disclosed. Suffice to say here that a magnetostrictive type, for example, consists of a diaphragm which is smooth on one side. On the other side of the diaphragm several hundred small nickel tubes are imbedded. Each tube has a coil of wire wrapped around it and all coils are connected together in an electrical circuit so that only a minimum number of wires are necessary for lead-in purposes. The inherent characteristics of a nickel tube are such that if an alternating current of supersonic frequency which may be of the order of 15 to 30 kc. is impressed upon the coil surrounding the tube, the supersonic frequency variations in the magnetic field produced by such current will cause corresponding supersonic frequency variations in the length of the nickel tube. Since the tubes are imbedded in the diaphragm, the latter will be caused to vibrate at the same frequency to produce compressional sound waves of the same frequency.

Since in an alternating current cycle there are two peak values of the current, one positive and the other negative, it is evident that the nickel tubes would oscillate at double the frequency of the alternating current. This may be undesirable, however, and in order to eliminate it, each nickel tube may each be provided with a second coil which is supplied with direct current from a suitable source such as a motor-generator set or rectifier. The function of the direct current is to produce a uni-directional magnetic field which effectively restrains the nickel tube in one dimension. If the proper amount of direct current is applied, the pulsating magnetic field produced by the alternating current will be able to change the length of the nickel tube only once during each complete cycle of the alternating current because of the presence of the opposing uni-directional magnetic field produced by the direct current. As a result the nickel tube changes its length at the same frequency as that of the alternating current.

In sound projectors of this type, it is well known that the sound propagated may be confined to a "beam" if the ratio of the diameter of the vibrating diaphragm to the wave length of the sound wave is made sufficiently high. Thus by using supersonic frequencies of the order of 15 to 30 kc., a rather narrow conical beam having an apical angle of about 20° or less can be produced with a diaphragm of only a few inches in diameter.

Projector 22 is preferably secured in position by brackets 24—24 which anchor it to the web portion of the gear 21 and an electric cable 25 extends between the projector 22 and a suitable transmitter for feeding currents of supersonic frequency to "drive" the projector 22. A suitable transmitter as well as apparatus for receiving the echo of the sound waves will be described hereinafter.

The entire space within the spherical housing 18—19 may be filled with a liquid 27 such as ethylene glycol which will not freeze easily at low temperatures. Since this liquid is in contact with the diaphragm of the sound generator 22 on the inside surface of the sound transparent cap member 19 and the sea water is in contact with the outer surface of cap member 19, it will be evident that sound vibrations will be effectively conducted outwardly from the sound projector 22 to and through the sea water.

An annular bearing housing 28 is secured to the plate member 13 for receiving a ball bearing 29, the inner race of which makes a snug fit with the hollow shaft 15. At the top of shaft 15 and rotatively secured thereto is a second annular member 30. Member 30 contains a circular grooved portion 31 for receiving an annular yoke member 32 which may be split in two parts to permit assembly in the grooved portion 31.

A gear 33 contains a hollow hub portion 34 the upper part of which is provided with one or more slots 36 which are adapted to receive a corresponding number of coacting teeth 37 depending from the lower part of the annular member 30. The coacting slots 36 and teeth 37 function to couple the hollow shaft 15 for rotation with the gear 33.

The yoke 32 is slotted at 38—38 on each side thereof for interfitting with a pair of vertically extending supports 39—39. This permits the yoke 32 and the hollow shaft 15 attached thereto through the annular member 30 to be raised through suitable mechanism not shown so as to place the spherical housing 18—19 in a protective position within the sea chest 11 when the apparatus is not in use.

For controlling rotation of the shaft 15 and hence rotation of the sound projector 22 in azimuth, I prefer to use a system comprising a self-synchronous type generator 40 sometimes referred to in the art as a Selsyn generator or transmitter, to drive a repeater, or receiver, motor 41, the latter driving a worm gear 42 which is meshed with the gear 33. The generator 40 is connected electrically to the motor 41 by conductors 43.

As is well known in this type of self-synchronous generator-motor combination, rotation of the rotor of the generator 40 by any suitable means such as the handle 44 will produce a corresponding rotation of the rotor of the motor 41.

For repeating remotely the position of the shaft 15, a second selsyn transmitter or generator 45 may be driven through meshed gears 46 and 47, the latter gear being rotatable with gear 33. Generator 45 is connected by conductors 48 to a selsyn repeater motor 49 and a compass card 50 rotates with the rotor of motor 49 to indicate the instant azimuth of the shaft 15 and of the sound projector 22. The gear ratios are of course so selected that a given rotation of the shaft 15 effects an equal rotation of the compass card 50.

For controlling the angle of tilt of the sound projector 22, from the vertical, I also prefer to utilize a self-synchronous generator-repeater motor combination consisting of a generator 51, the rotor of which may be turned by handle 52, and a motor 53 electrically connected to generator 51 by means of conductors 54. A pinion gear 55 driven by motor 53 meshes with a ring gear 56, the latter being mounted on and serving to drive a shaft 57 which extends downwardly through the hollow shaft 15 and terminates within the housing 18—19. At the bottom of shaft 57 is mounted a pinion gear 58 which meshes with gear 21. Thus as the rotor of generator 51 is turned by handle 52, the rotor of motor 53 will also be caused to turn to drive pinion 55, ring gear 56, shaft 57, pinion 58 and gear 21. This causes the projector 22 to be tilted about an axis which is concentric with the shaft 20. As seen from Fig. 1, tilt of the projector 22 can vary from a little above horizontal to slightly past a vertically downward position.

The angle of tilt of the projector 22 may also be remotely indicated by means of still another self-synchronous generator-repeater motor combination consisting of a generator 59 driven off ring gear 56 by pinion 60. Generator 59 is electrically connected to repeater motor 61 by means of conductors 62 and a card 63 suitably inscribed with tilt angle indicia is rotated by motor 61.

Thus since the projector 22 may be tilted vertically through an arc of better than 90° and can also be rotated horizontally through a complete circle, it will be evident that any object searched for by the sound beam propagated from the projector 22 will never be in such a position that the beam cannot intercept it.

Figure 2:
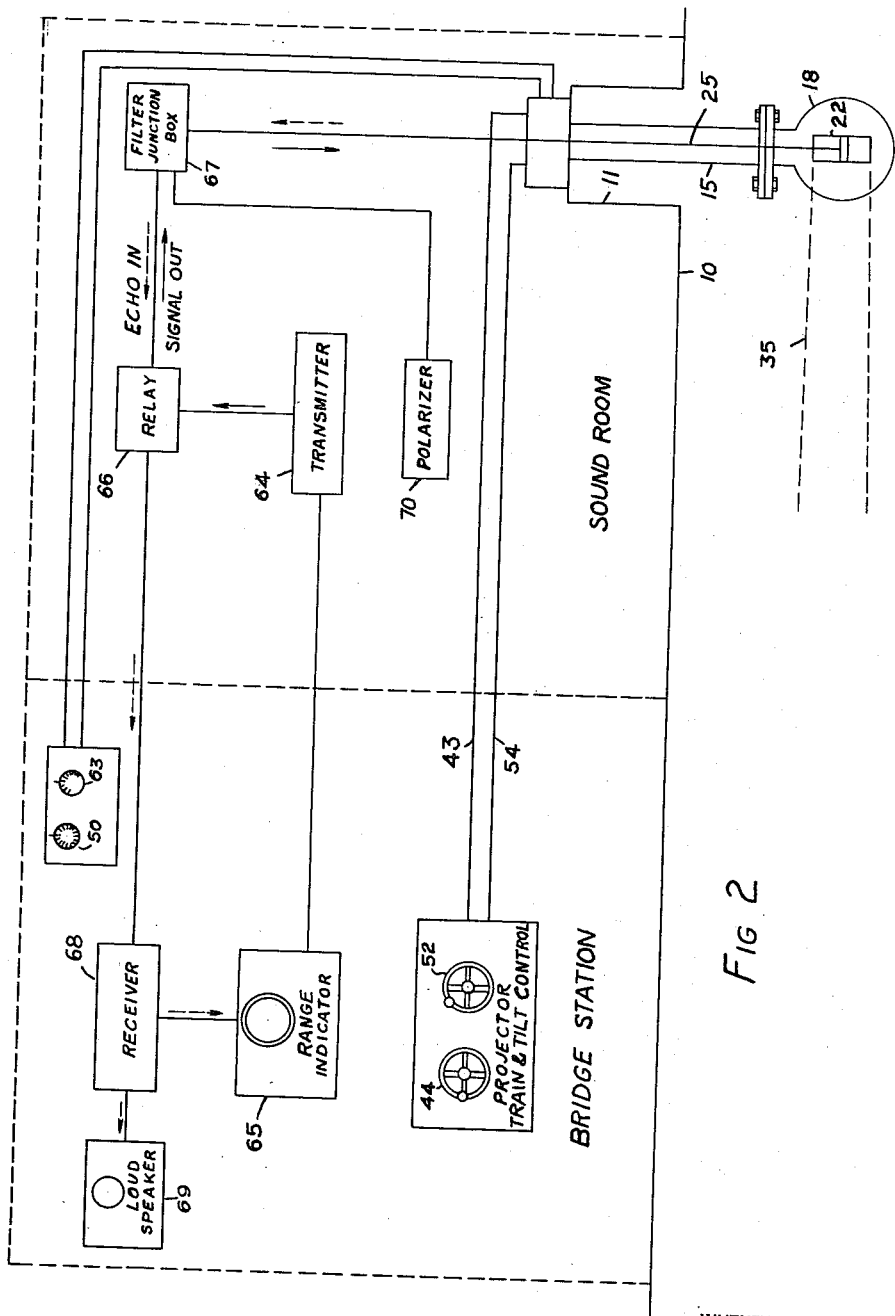
Fig. 2 is a diagrammatic representation of suitable apparatus for utilizing the projector shown in Fig. 1 in an echo ranging system.

Referring now to Fig. 2, there is shown a suitable apparatus for generating an alternating electric current of supersonic frequency which is impressed upon the sound projector 22, and also for receiving the echo of the sound beam as it is reflected by an underwater object such as a submarine.

In particular, such apparatus includes a transmitter 64 which may be similar to a low frequency radio transmitter. The output from the transmitter may be keyed automatically from suitable controls provided on a range indicator 65 or may be keyed by hand to send signals of a frequency preferably between 15 and 30 kc. to the projector 22 through an intermediately disposed relay 66 and filter junction box 67.

For receiving the echo of the intercepted sound beam 35, a receiver 68 may be utilized. This receiver may be similar to any radio receiver of the superheterodyne type except that it is arranged to cover a frequency between 13 and 37 kc. approximately. The receiver input terminals are connected to the projector 22 through the relay 66 and filter junction box 67, the projector 22 serving as an antenna. The output from the receiver supplies sound to a loud-speaker 69 and also furnishes signals to operate the range indicator 65. The loud-speaker enables one by ear to distinguish between a true echo and interference. The range indicator 65, receiver 68 and loud-speaker 69 are preferably located together at some ship station along with the bearing and tilt angle indicators 50, 63 and control handles 44 and 52 for generators 40 and 51 which control respectively the bearing and tilt angle of the sound projector 22, as previously described.

The range indicator 65 is a device which computes automatically and visually indicates the range or linear distance between the projector 22 and the underwater object from which the sound waves are reflected. The velocity of sound through water may for all practical purposes be considered a constant. Hence the range shown by the indicator 65 is a function of the time interval between the instant that the transmitter 64 is keyed by controls on the indicator to initiate a sound pulse from projector 22 and the instant the echo of the pulse is received.

Relay 66, sometimes called a keying relay, is an electrically operated switch. This relay normally connects the receiver 68 to the projector 22 and the equipment is then in a listening or echo receiving condition. However, when the transmitter 64 is keyed by the range indicator 65, a fraction of a second before the signal starts to go out, the relay disconnects the receiver 68 and connects the transmitter 64 to the projector 22. When keying actions stop, relay 66 functions to disconnect the transmitter 64 and reconnects the receiver 68 with the projector 22.

A polarizer 70, which may be a rectifier or motor-generator set, comprises a source of direct current which is used to energize certain of the coils surrounding the nickel tubes in the projector 22.

The filter junction box 67 contains the circuit elements which serve to separate the various voltages and keep them flowing in their proper paths. Direct current can then flow from the polarizer 70 to the direct current coils surrounding the nickel tubes in the projector 22 but can not flow into the transmitter 64 or receiver 88. The signal currents can flow into or out of the projector 22 from the transmitter 64 or to the receiver 68 as the case may be but cannot flow into the polarizer 70.

Preferably, the polarizer 70, transmitter 64, relay 66 and filter junction box 67 are all located together and as close as possible to the sound projector 22.

Referring now to Figs. 2, 3 and 4, my novel method of anti-submarine warfare may be explained as follows:

A sound projector 22 as shown in Fig. 1 mounted beneath the hull of a surface vessel 71 is rotated by turning the handle 44 and tilted at various angles by rotating the handle 52 to search out an expanse of water with a beamed, compressional, sound wave of supersonic frequency in order to locate enemy submarines.

If a submarine such as indicated at 72 is lurking within range of the sound beam as the latter searches, an echo of the sound will be received when the beam intercepts one end of the submarine. The linear distance between the projector 22 and the submarine will be indicated automatically on the range indicator 65 and the relative bearing of the submarine indicated by the compass card 50. The sound beam is then moved across the body of the submarine 72 until its echo is no longer received. This point will obviously be at the other end of the submarine. A second reading is then made on the range indicator 65 and the bearing again noted on the compass card 50. From these data, the instant course of the submarine 72 may be computed and plotted by well known means and the vessel 71 then set upon a "collision course" with the submarine to intercept it.

In view of the fact that the submarine will also most probably be equipped with sound detection devices, it is not expected that the submarine will maintain a steady course once it is aware that an attacking vessel is in the near vicinity. However, by continuously maintaining sound contact with the submarine by the foregoing method of taking periodic sets of readings of the distance and of the bearing of the sound projector 22, and establishing a new "collision course" for each time the submarine changes course, it is obvious that with a fair degree of training of personnel, the range between the attacking vessel and submarine can steadily be closed until the attacking vessel is almost certain that it will cross the course of the submarine at a point directly over the latter.

As the range between the attacking vessel and submarine is closed, the depressed tilted angle of the sound beam as indicated by the card 63 will become increasingly greater and will ultimately indicate a vertical angle of nearly 90° when the vessel 71 is almost directly over the submarine 72, which is the desired objective.

When such a position is reached, a series of contact detonated bombs 73 are then dropped over the stern of the attacking vessel. If the computations have been correct, one of the bombs will probably strike against the hull of the submarine and explode with sufficient force to either sink the submarine or at least damage it to the extent that surfacing thereof will be necessary.

If it should happen that none of the bombs strike the submarine, no explosions will of course occur. In such event sound contact with the submarine can be maintained without any interruption and the operation repeated so that the attacking vessel can maneuver to again cross over the submarine whereupon another series of contact detonated bombs will be dropped.

This new method is obviously an improvement over the old method of a high speed run-in and the use of depth charges which explode upon reaching a certain depth, for as previously explained, in the old method, the exploding depth charges set up such a turbulence that sound contact with the submarine is obviously lost and cannot be reestablished quickly in the event that none of the depth charges has damaged the submarine. This affords the submarine an opportunity to escape.

It will be evident from the foregoing that the value of distance established by the technique of echo ranging is the linear distance and not the surface distance. However since the linear distance and tilt angle are known, the surface distance may be established at any time by computing the value of the horizontal component of the linear distance. Similarly, the value of the vertical component of the linear distance will obviously give one the depth at which the under water object is located below the surface of the water.

In conclusion, I wish it to be understood that the specific embodiment of my invention which has been presently described is illustrative only and that modifications thereof may be made by those skilled in the art without departing from the spirit and scope of my invention as expressed in the appended claims.

The invention described herein may be manufactured and used by or for the Government of the United States of America for governmental purposes without the payment of any royalties thereon or therefor.

Having thus fully described my invention, I claim:

1. In a submarine signalling device the combination of a projector including a diaphragm adapted to vibrate to thereby transmit a beam of compressional wave energy through a water medium, means adapted to secure said projector to the underside of a vessel whereby said projector will be disposed below the surface of said water medium, said means including a hollow shaft adapted to extend through the ship's skin from the interior to the exterior of said vessel, a housing connected to the lower end of said hollow shaft within which said projector is disposed, said housing comprising substantially hemispherical sound transparent and non-transparent portions joined together in a plane inclined at substantially forty-five degrees to form substantially a sphere, pivot means for supporting said projector within said housing on an axis normal to the longitudinal axis of said hollow shaft, fluid means filling said spherical housing, means mechanically coupled to said hollow shaft for rotating the latter and hence said projector, and means for tilting said projector about said pivot means from a position wherein said diaphragm is normal to the horizon to transmit a horizontally directed beam of compressional wave energy to a position wherein said diaphragm will be horizontal to transmit a vertically downward directed beam of compressional wave energy, said tilting means including a shaft extending through said hollow shaft, a pinion gear fixed to the end of said shaft extending into said spherical housing and a sector gear fixed to said projector in mesh with said pinion.

2. In a submarine signalling device, the combination comprising a sound transducer including a diaphragm adapted to vibrate to thereby transmit and receive in a directive beam waves of compressional energy through a water medium, means adapted to mount said transducer on the underside of a vessel whereby said transducer will be disposed below the surface of said water medium, a housing for said transducer, means for rotating said housing together with said transducer about a vertical axis relative to said vessel, said housing including sound transparent and non-transparent portions joined together in a plane inclined at approximately forty-five degrees relative to said vessel, said sound transparent portion extending completely throughout one hemisphere, means for pivoting said transducer about a horizontal axis relative to said vessel and said housing, said axes intersecting said inclined plane.

References Cited in the file of this patent

UNITED STATES PATENTS

| | | |
|---|---|---|
| 1,152,661 | Schiessler | Sept. 7, 1915 |
| 1,360,664 | Miller | Nov. 30, 1920 |
| 1,379,506 | Akemann | May 24, 1921 |
| 1,719,937 | Kunze | July 9, 1929 |
| 1,788,793 | Hall | Jan. 13, 1931 |
| 1,858,931 | Langevin et al. | May 17, 1932 |
| 2,019,497 | Kuntze | Nov. 5, 1935 |
| 2,133,241 | Baker | Oct. 11, 1938 |
| 2,166,162 | Kunze | July 18, 1939 |
| 2,361,177 | Chilowsky | Oct. 24, 1944 |
| 2,407,697 | Williams | Sept. 17, 1946 |
| 2,452,068 | Peterson | Oct. 26, 1948 |
| 2,536,771 | Rost et al. | June 2, 1951 |

FOREIGN PATENTS

| | | |
|---|---|---|
| 644,117 | Germany | Apr. 24, 1937 |
| 546,202 | Great Britain | July 2, 1942 |